United States Patent
Rising, III

(10) Patent No.: US 7,275,067 B2
(45) Date of Patent: Sep. 25, 2007

(54) METHOD AND APPARATUS FOR PROVIDING MULTIPLE LEVELS OF ABSTRACTION IN DESCRIPTIONS OF AUDIOVISUAL CONTENT

(75) Inventor: Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1317 days.

(21) Appl. No.: 09/905,524

(22) Filed: Jul. 13, 2001

(65) Prior Publication Data

US 2002/0070959 A1 Jun. 13, 2002

Related U.S. Application Data

(60) Provisional application No. 60/219,164, filed on Jul. 19, 2000.

(51) Int. Cl.
*G06F 17/30* (2006.01)
(52) U.S. Cl. .............. 707/104.1; 707/102; 709/231
(58) Field of Classification Search ............... 707/3, 707/10, 100, 104.1, 102, 101; 716/1; 382/209, 382/219; 709/231
See application file for complete search history.

(56) References Cited

U.S. PATENT DOCUMENTS

| | | | | |
|---|---|---|---|---|
| 5,468,085 A * | 11/1995 | Kline | ........................ | 402/79 |
| 5,995,958 A * | 11/1999 | Xu | ............................ | 707/3 |
| 6,223,183 B1 * | 4/2001 | Smith et al. | .............. | 707/102 |
| 6,285,788 B1 * | 9/2001 | Sezan et al. | .............. | 382/217 |
| 6,356,658 B1 * | 3/2002 | Sezan et al. | .............. | 382/209 |
| 6,564,263 B1 * | 5/2003 | Bergman et al. | ......... | 707/104.1 |
| 6,593,936 B1 * | 7/2003 | Huang et al. | ............... | 345/619 |
| 6,621,895 B1 * | 9/2003 | Giese | ................... | 379/201.03 |
| 6,625,780 B1 * | 9/2003 | Charbon et al. | .............. | 716/1 |
| 6,714,909 B1 * | 3/2004 | Gibbon et al. | ............. | 707/102 |
| 6,842,906 B1 * | 1/2005 | Bowman-Amuah | ........ | 719/330 |
| 7,010,036 B1 * | 3/2006 | Mory | ................... | 375/240.08 |
| 2002/0157116 A1 * | 10/2002 | Jasinschi | .................... | 725/136 |
| 2003/0061610 A1 * | 3/2003 | Errico | ......................... | 725/46 |

OTHER PUBLICATIONS

Hu, Michael J. et al., "Multimedia Description Framework (MDF) for Content Description of Audio/Video Documents", ACM 1999, pp. 67-75.*
Martinez, Jose M. (UAM-GTI, ES), "Coding Of Moving Pictures And Audio—MPEG-7 Overview" (version 9), International Organisation For Standardisation, ISO/IEC JTC1/SC29/WG11, N5525, Mar. 2003.*
Nack, Frank et al., "Everything You Wanted to Know About MPEG-7 Part 2", 1999 IEEE, pp. 64-73.*
Rehm, Eric, "Representing Internet Streaming Media Metadata using MPEG-7 Multimedia Description Schemes", ACM Multimedia Workshop, ACM 2000, pp. 93-98.*

* cited by examiner

*Primary Examiner*—Shahid Al Alam
(74) *Attorney, Agent, or Firm*—Blakely, Sokoloff, Taylor & Zafman LLP

(57) ABSTRACT

A method and apparatus for processing descriptions of audiovisual content are described. According to one embodiment, a description of audiovisual content is evaluated and a determination is made as to whether the description is an abstraction. If it is determined that the description is an abstraction, then a level of abstraction is calculated and an indicator of the level of abstraction is stored with the description of audiovisual content.

22 Claims, 4 Drawing Sheets

METHOD AND APPARATUS FOR PROVIDING MULTIPLE LEVELS OF ABSTRACTION IN DESCRIPTIONS OF AUDIOVISUAL CONTENT

RELATED APPLICATIONS

This application claims the benefit of U.S. Provisional Application No. 60/219,164, filed Jul. 19, 2000.

FIELD OF THE INVENTION

The present invention relates to multimedia data processing and more specifically to processing of multimedia data based upon semantic descriptions.

BACKGROUND OF THE INVENTION

The Motion Picture Expert Group (MPEG) develops standards concerning audiovisual content. One component of the MPEG standard scheme includes MPEG-7 standards which are directed to providing descriptions of audiovisual content that may be of interest to the user. Specifically, the MPEG-7 standards are developed to standardize information describing the audiovisual content. The MPEG-7 standards may be used in various areas, including storage and retrieval of audiovisual items from databases, broadcast media selection, tele-shopping, multimedia presentations, personalized news service on the Internet, etc.

According to current MPEG-7 standards, descriptions of audiovisual content are divided into structural (or segment) descriptions and semantic descriptions. Structural descriptions describe the audiovisual content from the viewpoint of its structure. That is, the descriptions are structured around segments which represent physical spatial, temporal or spatio-temporal components of the audiovisual content. Each segment may be described by signal-based features (color, texture, shape, motion, audio features, etc.) and some elementary semantic information.

Semantic descriptions describe the audiovisual content from the viewpoints of its conceptual notions. The semantic descriptions involve entities such as objects, events, abstract concepts and relationships. The structural descriptions and semantic descriptions are related by a set of links, which allows the audiovisual content to be described on the basis of both content structure and semantics together. The links relate different semantic concepts to the instances within the audiovisual content described by the structural descriptions.

Semantic descriptions describe entities that are either concrete or abstract. A concrete entity can have an instance in the real world or the media. An abstract entity results from applying abstraction to a physical entity. Various levels of abstraction may be applied to a physical entity when creating a description. For instance, a description may be created as a media abstraction. A media abstraction results from generalizing a media, i.e., the description is not attached to a specific media. A formal abstraction (or a lambda abstraction) is created from a description of a concrete entity by generalizing one or more elements of the entity, i.e., by substituting one or more elements of the entity by a variable. A description may also be created as an abstraction of a higher degree (e.g., a metaphor, an abstraction of abstractions, etc.).

An abstraction can be used as a template for creating descriptions of specific audiovisual items or lower level abstractions. For instance, an archivist who needs to create a catalog of a large number of audiovisual items contained in a digital library can use such templates to create descriptions of these audiovisual items. In another example, existing abstractions can be reused by software when generating new descriptions. However, no mechanism currently exists to indicate that a description is an abstraction and to identify the type of the abstraction (i.e., whether the description is a media abstraction, a lambda abstraction, a metaphor, etc.), thereby complicating a task of creating new descriptions from existing descriptions.

SUMMARY OF THE INVENTION

A method and apparatus for processing descriptions of audiovisual content are described. According to one embodiment, a description of audiovisual content is evaluated and a determination is made as to whether the description is an abstraction. If it is determined that the description is an abstraction, then a level of abstraction is calculated and an indicator of the level of abstraction is stored with the description of audiovisual content.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
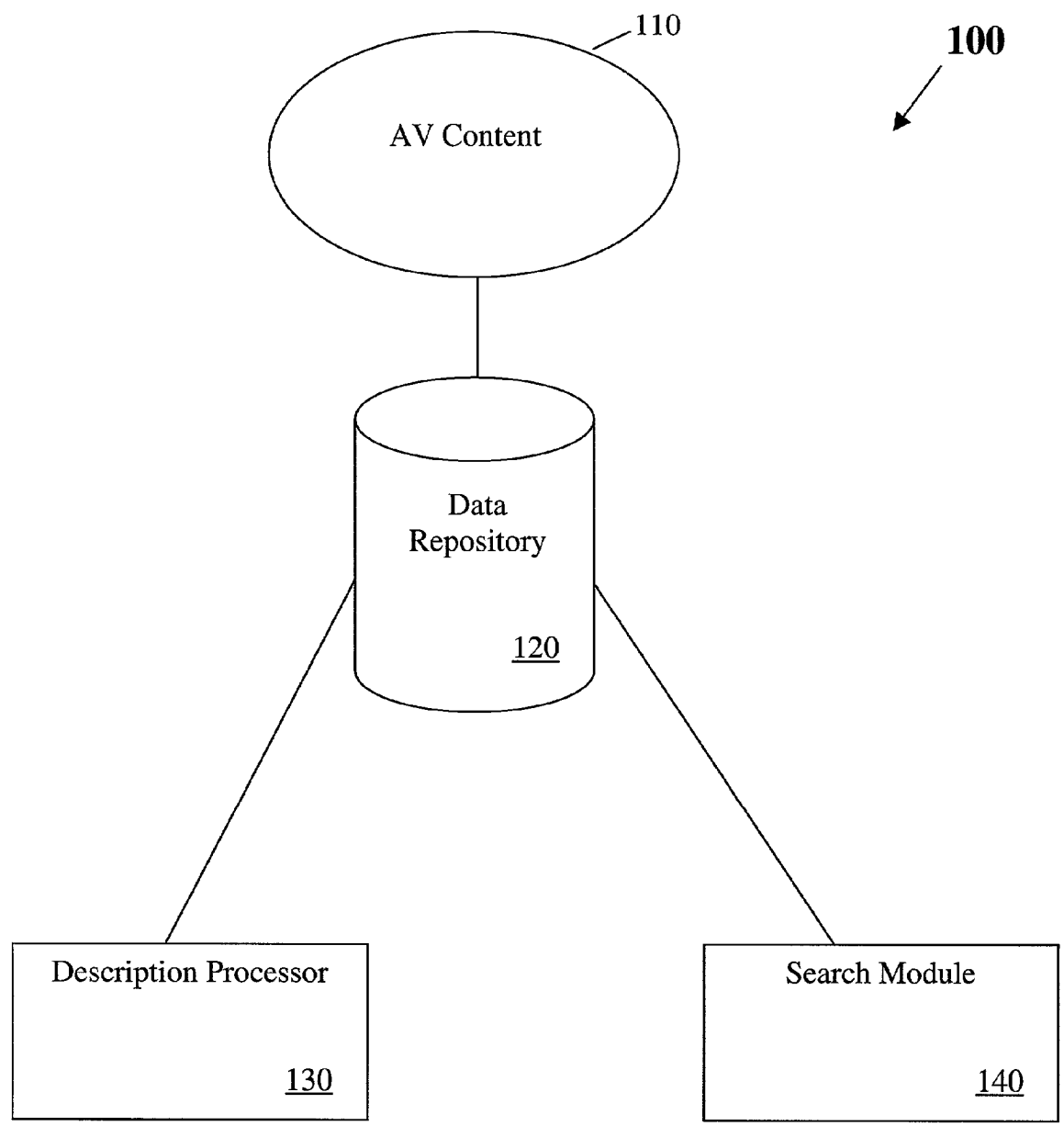
FIG. 1 is a block diagram of one embodiment of a system for processing descriptions of audiovisual content.

A method and apparatus for processing descriptions of audiovisual content are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of one embodiment of a system 100 for processing descriptions of audiovisual content. System 100 includes a data repository 120 coupled to audiovisual content 110. Data repository 120 contains descriptions of audiovisual content 110. In one embodiment, audiovisual content 110 is stored independently. Alternatively, audiovisual content may be stored together with the descriptions in data repository 120.

The descriptions consist of descriptors and description schemes. Descriptors represent features of the audiovisual content 110 and define the syntax and the semantics of each feature representation. Description schemes (DS) specify the structure and semantics of the relationships between their components. These components may be both descriptors and description schemes. Conceptual aspects of a description scheme can be organized in a tree or in a graph. The graph structure is defined by a set of nodes that represent elements of a description scheme and a set of edges that specify the relationship between the nodes.

System 100 further includes a description processor 130. In one embodiment, the description processor 130 evaluates descriptions stored in data repository 120 and determines which of these descriptions are abstractions. A description is an abstraction if it is not linked to a specific entity or a specific media. If a description is an abstraction, the description processor 130 determines its abstraction level. An abstraction level identifies a type of abstraction. For instance, a description may be a media abstraction, which is created by generalizing the media. Alternatively, a description may be a formal abstraction (or a lambda abstraction) which generalizes one or more elements of a concrete entity by replacing them with variables. A description may also be an abstraction of a higher degree (e.g., a metaphor, an abstraction of graph relations, etc.). When the abstraction level is determined, it is stored in data repository 140, together with the description.

In another embodiment, the description processor 130 makes a determination of whether a description is an abstraction during creation of the description. If the determination is positive, the description processor 130 calculates the level of abstraction, and the new description is stored in data repository 140 with an indicator of the level of abstraction. In one embodiment, a new description is created using an existing description. For example, software that generates descriptions can use an existing description of an abstract event to create a new description of a concrete event by replacing one or more variables in the existing description with corresponding attributes of the concrete event. In this embodiment, an abstraction level indicator may be used to find an existing description that can be used to create a new description.

System 100 also includes a search module 140 which is responsible for searching data repository 120 and retrieving requested descriptions and audiovisual content 110. In one embodiment, the search module 140 retrieves descriptions from data repository 120 based on a user selection of an abstraction level.

Figure 2:
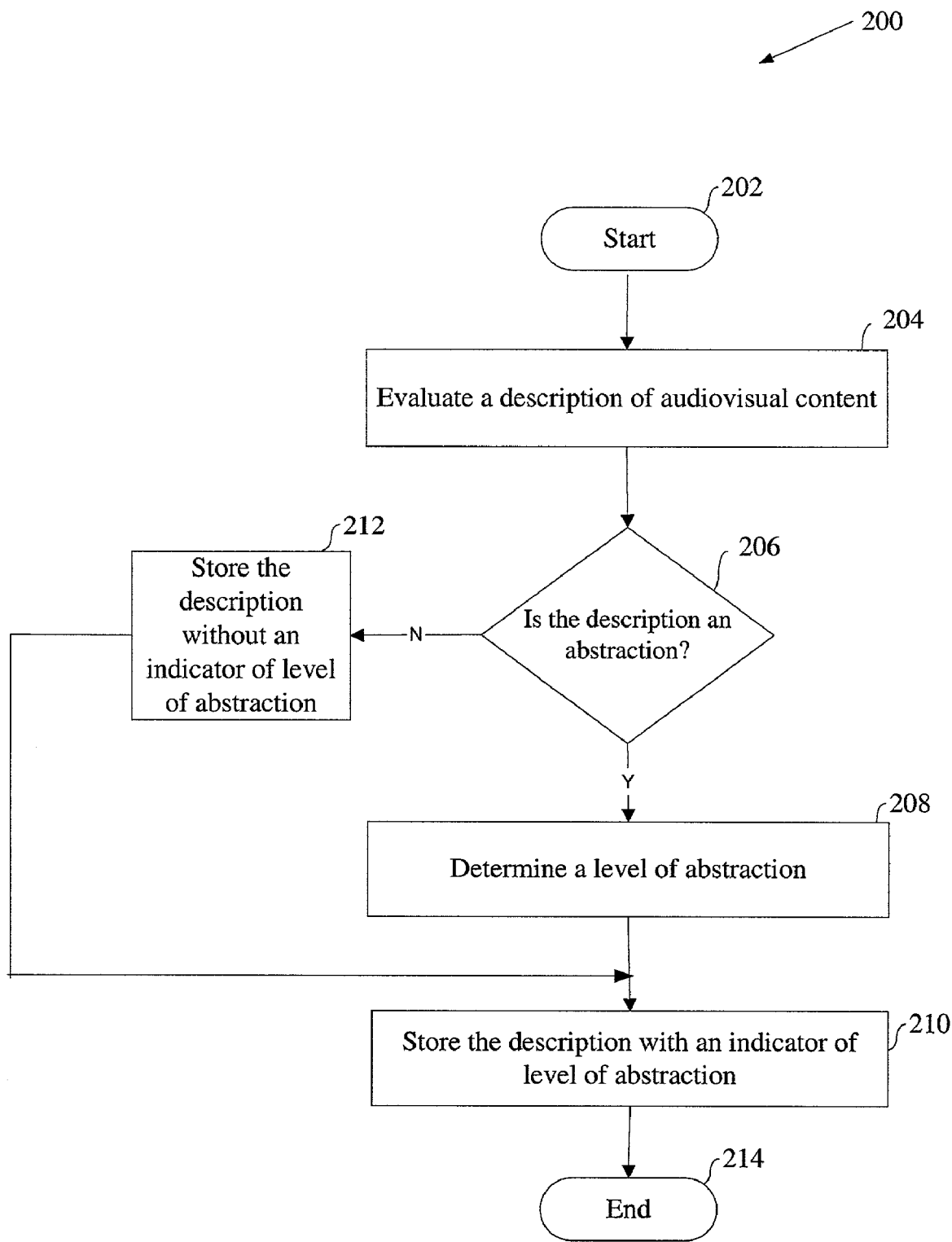
FIG. 2 is a flow diagram of one embodiment for processing descriptions of audiovisual content.

FIG. 2 is a flow diagram of one embodiment for processing descriptions of audiovisual content. At process block 204 a description of audiovisual content is evaluated. In one embodiment, the description being evaluated is an existing description which is stored in data repository 120. Alternatively, the evaluation is performed when creating a new description.

At processing block 206, a determination is made as to whether the description is an abstraction. This determination depends on whether the description is linked to a specific media or a concrete audiovisual item.

If the determination is positive, a level of abstraction is calculated at processing block 208. For example, the lowest level of abstraction may correspond to a media abstraction, the next level may correspond to a lambda abstraction, and higher levels of abstraction may correspond to metaphors or abstractions of abstractions. A metaphor describes a person or object in a literary way by referring to something that is considered to possess similar characteristics to the person or object being described. For example, such expressions as "flying as a bird" and "feeling like a fish out of water" are metaphors. Abstractions of abstractions include abstractions of graph relations, graph morphisms, etc. Abstractions of graph relations are made by describing sets of relations, or by using a very general relation in place of something more specific. Abstractions of graph morphisms are essentially descriptions of how the descriptions themselves relate to each other. Further, the description may be stored in data repository 120, together with an indicator of the level of abstraction.

In one embodiment, an abstraction level indicator is an optional element of a description, i.e., it is added to the description only if the description is an abstraction. In this embodiment, if the determination made at decision box 206 is negative (i.e., the description is not an abstraction), the description is stored in data repository 120 without an abstraction level indicator at processing block 212. In another embodiment, an abstraction level indicator may be a required element of a description that includes a value identifying an abstraction level of the description, or alternatively, indicating that the description is not an abstraction.

In one embodiment, the abstraction level indicator is utilized to search data repository 120 and retrieve descriptions of a certain level of abstraction. In another embodiment, the abstraction level indicator is utilized to create new descriptions from an existing description as described in more detail above.

In one embodiment, descriptions of audiovisual content include structural descriptions and semantic descriptions. Structural descriptions describe the audiovisual content from the viewpoint of its structure, i.e., such components of the audiovisual data as regions, segments, frames, shots, etc. The structural descriptions may describe such perceptual features of components of the audiovisual data as color, texture, shape, motion, pitch, rhythm, etc. Semantic descriptions describe the audiovisual content from the conceptual viewpoints, i.e., they describe the meaning of audiovisual content. The semantic descriptions involve entities such as objects, events, states and abstract concepts. The structural descriptions and semantic descriptions are related by a set of links, that allows the audiovisual content to be described on the basis of both content structure and semantics together. The links relate different semantic concepts to the instances within the audiovisual content described by the structural descriptions.

According to the MPEG standards, the semantic descriptions are divided into two types depending on their usage mode. The first type includes data describing audiovisual content and is referred to as "descriptive data". For instance, the descriptive data may include a set of descriptions (i.e., descriptors and description schemes) describing a specific instance in the audiovisual material. The second type is used to access one or more individual instances in the audiovisual content and is referred to as "accessing data". For instance, the object "car" may be used to locate all instances of cars in the audiovisual content. That is, accessing data functions as an index, pointing to all occurrences of a particular description. In one embodiment, each semantic description includes an element referred to as a "usage label", which indicates whether the description is of an accessing type or a descriptive type. In one embodiment, the usage label is used for abstraction. Alternatively, any other element (existing or new) of a description may be used for this purpose.

Figure 3:
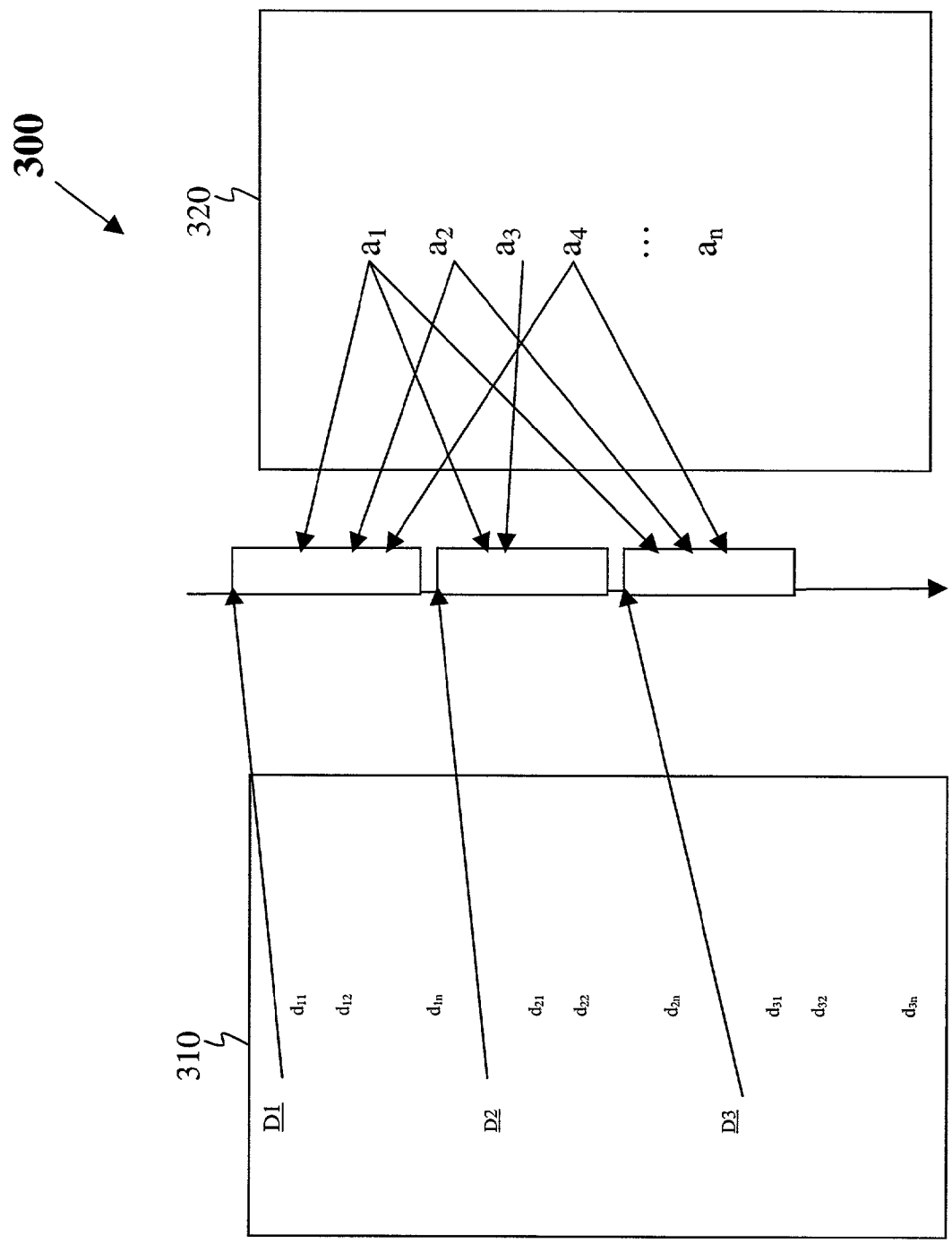
FIG. 3 illustrates two usage modes of semantic descriptions.

FIG. 3 illustrates two usage modes of semantic descriptions. Referring to FIG. 3, descriptive data 310 includes a set of descriptions D1 through D3, wherein each of the description D1 through D3 describes a specific piece of audiovisual content 330 using descriptions of associated attributes. For example, audiovisual content 330 may be a video of a hockey game. Then, D1 may describe a first period of the hockey game using descriptions d11 through d1n, D2 may describe a second period of the hockey game using descriptions d21 through d2n, and D3 may describe a third period of the hockey game using descriptions d31 through d3n.

Accessing data 320 includes a set of descriptions a1 through an, wherein each accessing data 320 is linked to all occurrences of any of descriptive data 310 in the audiovisual content 330. For example, description a1 may point to all occurrences of scoring a goal in the soccer game. Scoring of the goal may be described by descriptions d11, d23 and d3n.

However, if the arrows pointing from an accessing description to instances in the audiovisual content 330 are reversed, the accessing description becomes an abstraction of a set of descriptions within the descriptive data 310. That is, each descriptive data pointing to an accessing description would have an "is a" or a similar relation to this accessing description. For instance, if the arrows pointing from a1 to instances of the goal in the audiovisual content are reversed, the accessing description a1 becomes an abstraction of a description set consisting of d11, d23 and d3n.

In one embodiment, a usage label is an optional element of a description. For example, if a description is of an accessing type, it is considered an abstraction. Therefore, accessing descriptions always include a usage label. If a description is of a descriptive type, it may or may not include a usage label depending on whether it refers to a specific media or a specific instance in the media (i.e., depending on whether the description is an abstraction or not).

In one embodiment, the usage label includes a numeric field and a "term". The numeric field identifies the abstraction type of the description. For instance, the value of 0 may correspond to a media abstraction, 1 may correspond to a lambda abstraction, 2 may correspond to a metaphor, 3 may correspond to an abstraction of graph relations, 4 may correspond to an abstraction of graph morphisms, etc. The "term" is a pointer to a particular entry in a classification scheme. The classification scheme represents a controlling vocabulary which is used for creating descriptions. Each entry in the classification scheme includes a set of related data (e.g., labels, definitions in different foreign languages, etc.). That is, the description is an abstraction of the set of data included in the classification scheme entry. Accordingly, one can learn additional information related to the description from the data included in the entry referred to by the term.

In another embodiment, any new or existing element rather than the usage label may be used to include a numeric field and a term in descriptions. In yet another embodiment, two elements are used for this purpose: a first element contains a numeric field and a second element contains a term.

Figure 4:
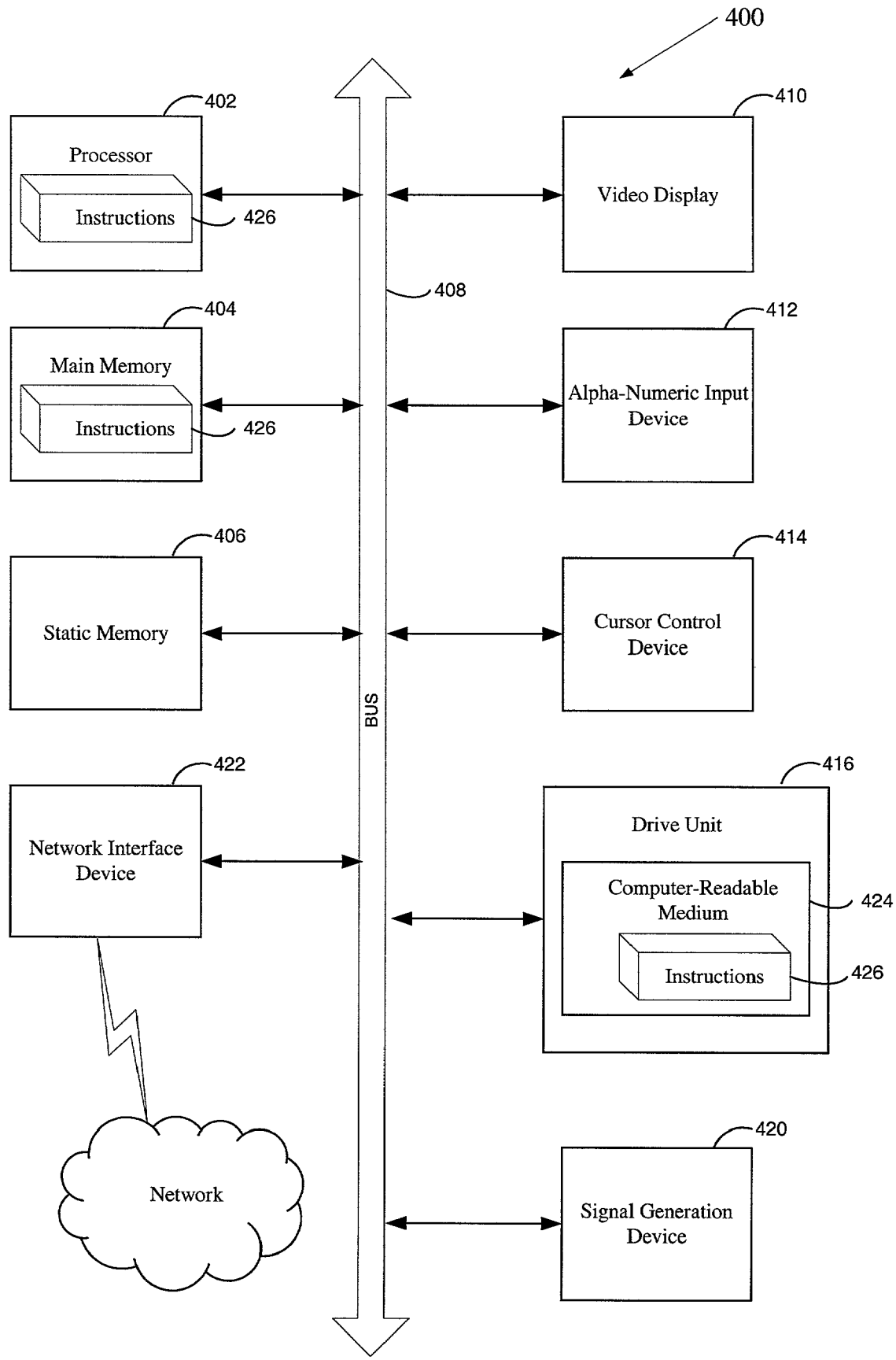
FIG. 4 is a block diagram of one embodiment of a computer system.

FIG. 4 is a diagrammatic representation of a machine in the exemplary form of a computer system 400 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 420 (e.g., a speaker) and a network interface device 422.

The disk drive unit 416 includes a computer-readable medium 424 on which is stored a set of instructions (i.e., software) 426 embodying any one, or all, of the methodologies described above. The software 426 is also shown to reside, completely or at least partially, within the main memory 404 and/or within the processor 402. The software 426 may further be transmitted or received via the network interface device 422. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for processing descriptions of audiovisual content have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computerized method for processing descriptions of audiovisual content, the method comprising:
   evaluating a description of audiovisual content;
   determining whether the description is an abstraction; and
   if the description is an abstraction,
      determining a level of abstraction, wherein the level of abstraction identifies one of plurality of types of abstraction, and
      storing an indicator of the level of abstraction with the description of audiovisual content.

2. The method of claim 1 wherein the description of audiovisual content is a semantic description.

3. The method of claim 1 further comprising utilizing the indicator of the level of abstraction to determine a usage mode of the description of audiovisual content.

4. The method of claim 3 wherein the usage mode is any one of a descriptive mode or an accessing mode.

5. The method of claim 1 further comprising utilizing the indicator of the level of abstraction to determine whether the description of audiovisual content is a media abstraction.

6. The method of claim 1 further comprising utilizing the indicator of the level of abstraction to determine whether the description of audiovisual content is a lambda abstraction.

7. The method of claim 1 wherein the indicator of the level of abstraction includes a positive integer to store a number associated with the level of abstraction.

8. The method of claim 7 wherein the indicator further includes a term to point to one of a plurality of entries in a classification scheme, the one of the plurality of entries being defined by the abstraction.

9. The method of claim 1 wherein the description of the audiovisual content is a description scheme.

10. The method of claim 1 further comprising searching a database of descriptions using a level of abstraction specified by a user.

11. An electronic system for processing descriptions of audiovisual content, the system comprising:
   means for evaluating a description of audiovisual content;
   means for determining whether the description is an abstraction;
   means for determining a level of abstraction if the description is an abstraction,
   wherein the level of abstraction identifies one of plurality of types of abstraction; and
   means for storing an indicator of the level of abstraction with the description of audiovisual content upon determining the level of abstraction.

12. A computer system comprising:
   a description processor to determine that a description of audiovisual content is an abstraction and to calculate an abstraction level for the description, wherein the abstraction level identifies one of plurality of abstraction types; and
   a data depository to store the description with an indicator of the abstraction level.

13. The system of claim 12 wherein the description of audiovisual content is a semantic description.

14. The system of claim 12 wherein the indicator of the abstraction level defines a usage mode of the description.

15. The system of claim 14 wherein the usage mode is any one of a descriptive mode or an accessing mode.

16. The system of claim 12 wherein the indicator of the abstraction level indicates whether the description of audiovisual content is a media abstraction.

17. The system of claim 12 wherein the indicator of the abstraction level indicates whether the description of audiovisual content is a lambda abstraction.

18. The system of claim 12 wherein the indicator of the level of abstraction includes a positive integer to store a number associated with the level of abstraction.

19. The system of claim 18 wherein the indicator further includes a term to point to one of a plurality of entries in a classification scheme, the one of the plurality of entries being defined by the abstraction.

20. The system of claim 12 wherein the description of the audiovisual content is a description scheme.

21. The system of claim 12 further comprising a search module to search the data repository using a level of abstraction specified by a user.

22. A computer readable medium that provides instructions, which when executed on a processor, cause said processor to perform operations comprising:
   evaluating a description of audiovisual content;
   determining whether the description is an abstraction; and
   if the description is an abstraction,
      determining a level of abstraction, wherein the level of abstraction identifies one of plurality of types of abstraction, and
      storing an indicator of the level of abstraction with the description of audiovisual content.

* * * * *